Sept. 7, 1926.

S. B. ARNOLD

INTERNAL COMBUSTION ENGINE

Filed Dec. 19, 1919

Inventor:
Stanley B. Arnold,
By G. L. Cragg Atty.

Patented Sept. 7, 1926.

1,599,354

UNITED STATES PATENT OFFICE.

STANLEY B. ARNOLD, OF CHICAGO, ILLINOIS.

INTERNAL-COMBUSTION ENGINE.

Application filed December 19, 1919. Serial No. 346,027.

My invention relates to internal combustion engines and is of greatest interest in relation to engines of the two-stroke cycle type requiring two strokes of an engine piston to complete a cycle and in which exhaust of the burned gases from the cylinder of an engine is effected preferably through a port which is uncovered by the piston when at the end of its explosion stroke and in which a compressed fuel and air mixture enters the cylinder through a valve port at the other end of the cylinder, the flow of the compressed fuel and air mixture into the cylinder displacing the burned gas and forcing it out of the cylinder through the aforesaid exhaust port, although the invention is not to be thus limited.

Two stroke cycle engines of the usual types operate satisfactorily when not throttled, but when throttled not all of the burned gas is exhausted from the cylinder. This is because the exhaust of the burned gas is effected by the compressed fuel and air mixture displacing the burned gas and forcing it out of the cylinder, and so when less than a full charge of compressed fuel and air mixture enters the cylinder all of the burned gas is not exhausted therefrom. The amount of burned gas thus remaining in the cylinder depends upon the degree of throttling. The burned gas remaining in the cylinder mixes with the fuel and air mixture that enters the cylinder, rendering it less potent or so that it will not ignite at all. This results in loss of power and low thermal efficiency from the engine, and in misfiring, disagreeable odor of the gases exhausting from the engine, in extreme sensitiveness to changes in the proportions in the fuel and air mixture entering the cylinder etc. These defects make the usual types of two stroke cycle engines unsatisfactory for uses where varying power and engine speeds are required, as in automobiles and other self-propelled vehicles.

By means of my invention I reduce the above described undesirable characteristics to such an extent that they are not of serious moment in the operation of the engine that will, because of my invention, operate satisfactorily at all degrees of throttling and at all engine speeds.

I shall explain my invention more fully by reference to the accompanying drawing showing an engine constituting the preferred embodiment thereof and in which.

Like parts are indicated by similar characters of reference throughout the different figures.

The engine shown in the drawing being a two stroke cycle engine, an explosion occurs in each cylinder during every down stroke of the piston. There may be any number of cylinders and preferably a fly wheel in an engine embodying this invention. Each engine crank 2 has a separated enclosed case or chamber which is designed so as to reduce empty space. The preferred method of lubrication used in this engine is that of mixing of the lubricating oil with the fuel and feeding into the engine a mixture of fuel and oil and air from the carburetor, although the method of lubrication constitutes no part of the invention, and the engine is adaptable to use of other methods. Although in use of the preferred method of lubrication, oil flows with the fuel and air into the combustion chamber of the engine, such flow of oil might not occur in use of various other methods, in which cases only fuel and air would flow into the combustion chamber.

Figures 1, 4:
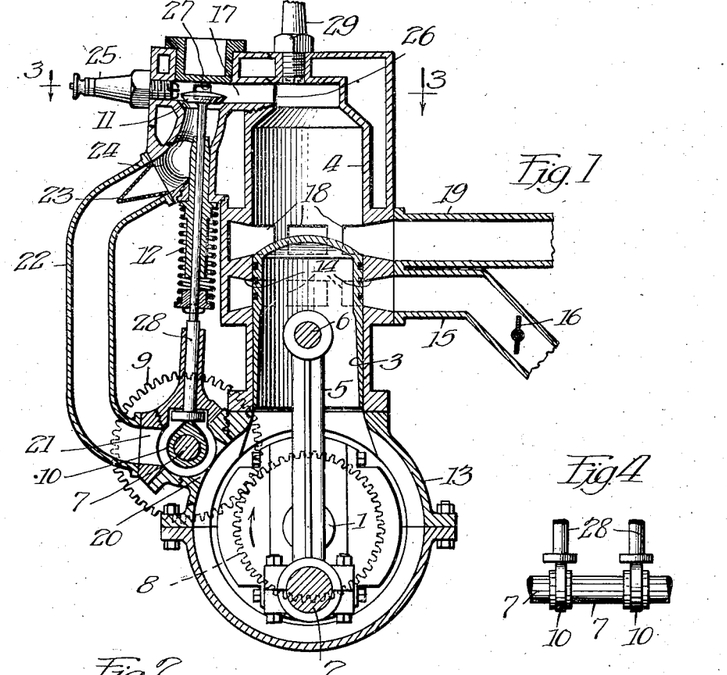
Fig. 1 is an elevational view mainly in section.
Fig. 4 is a side view illustrative of the valve operating mechanism, part of which is shown in section in Fig. 1.

In Fig. 1, when the crankshaft 1 and crank 2 rotate, the piston 3 is caused to ascend in the cylinder 4 by means of connecting rod 5 and gudgeon pin 6. As the crankshaft 1 rotates, the camshaft 7 is rotated by means of gears 8 and 9 in a direction opposite to that in which crankshaft 1 rotates but at the same speed. Duplicate cams 10 are placed on the camshaft 7 in solid rotative connection therewith. When the piston 3 has ascended but a short distance in the cylinder 4 the camshaft 7 and cams 10 have rotated and allowed duplicate intake valves 11 to be closed by means of their springs 12 and thereafter a vacuum is created in the crank case 13 during the ascent of the piston 3 until this piston uncovers the intake ports 14. These intake ports communicate by means of the intake tube 15 that contains the throttle 16 with a carburetor (not shown). Consequently when the piston 3 uncovers the intake ports 14 a charge of fuel and oil and air mixture is drawn through those ports into the crank case.

The piston 3 reaches the limit of its ascent in the cylinder 4 and starts to descend. As the piston 3 descends it covers the intake ports 14 and thereafter compresses the fuel and oil and air mixture in the crank case 13.

When the piston 3 descends in the cylinder 4, an explosion is taking place in the two combustion chamber passages 17 and in the cylinder 4 above the piston 3. How this explosion has been effected I shall explain further on in this description. When the piston 3 nears the limit of its descent it uncovers the exhaust ports 18, allowing the burned gas in cylinder 4 above the piston 3 to escape through those ports and the exhaust tube or manifold 19 to the atmosphere. Thus the burned gas that remains in the cylinder 4 above the piston 3 is reduced to atmospheric pressure or nearly so before the intake valves 11 are opened. Before the piston 3 reaches the limit of its descent in the cylinder 4, the cams 10 open the intake valves 11 simultaneously, allowing the fuel and oil and air mixture that has been compressed in the crank case 13 to rush through the port 20 around the cam shaft 7 and duplicate cams 10, through port 21, tube 22, wire gauze cone 23, forked intake passage 24, past intake valves 11, and so through the two combustion chamber passages 17 and into the cylinder 4 above the piston 3, forcing the burned gas that has remained therein out of the exhaust ports 18. Thus cylinder 4 above the piston 3 is scavenged of burned gas and filled with fresh fuel and oil and air mixture.

Figures 2, 3, 5:
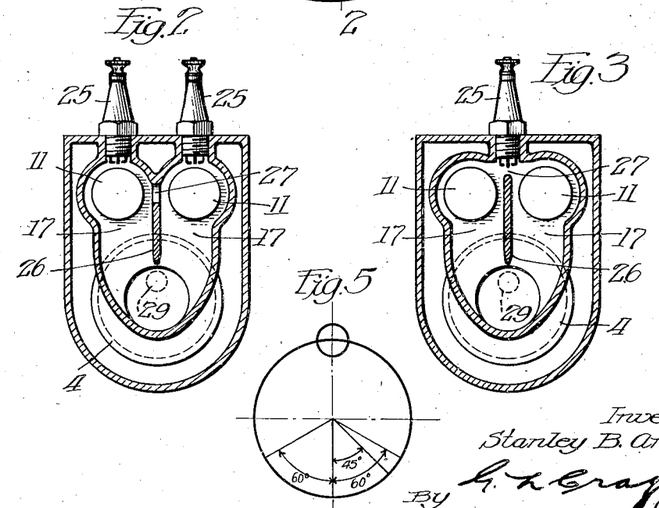
Fig. 2 and Fig. 3 are views mainly in section, taken through the combustion chamber on line 3—3 of Fig. 1, of two different designs of combustion chamber that may be employed in designing the engine, the design shown in Fig. 2 being the one employed in Fig. 1 and shown in elevation therein.
Fig. 5 is a diagram of the cycle of operations of the engine.

The piston 3 reaches the limit of its descent in cylinder 4 and starts to ascend. As the piston 3 ascends it covers exhaust ports 18 and cams 10 allow the intake valves 11 to close at practically the same instant as that at which the piston 3 covers exhaust ports 18. Thereafter the piston 3 in ascending compresses the fuel and oil and air mixture in cylinder 4 above piston 3 and in the two combustion chamber passages 17. At the proper time the charge of compressed fuel and oil and air mixture in cylinder 4 above piston 3 and in the two combustion chamber passages 17 is ignited by means of spark plug 25 in Fig. 3 or by either or both of spark plugs 25 simultaneously (either design of combustion chamber as shown in Figs. 2 and 3 can be used) and an explosion results which continues until after the piston 3 descends in cylinder 4 and uncovers exhaust ports 18 when near the limit of its descent in cylinder 4. Combustion chamber passages 17 are separated by a metal wall 26, in which is located a hole 27 near the spark plugs or spark plug 25. In Fig. 3 the hole 27 allows the single spark plug 25 to ignite the compressed fuel and oil and air mixture in both combustion chamber passages 17, and in Fig. 2 the hole 27 allows either of the two spark plugs 25 to ignite the compressed fuel and oil and air mixture in both combustion chamber passages 17.

When the engine is throttled by means of throttle 16 (understood to have been fully open heretofore in this description), less than a full charge of fresh fuel and oil and air mixture enters the combustion chamber passages 17 and cylinder 4 above piston 3 when intake valves 11 are opened, with the result that all of the burned gas that has remained in cylinder 4 above piston 3 after piston 3 has uncovered exhaust ports 18 is not forced out of those ports by the fresh fuel and oil and air mixture, but part of the burned gas remains in cylinder 4 above piston 3 after piston 3 ascends in cylinder 4 and covers exhaust ports 18. The result is that there is mixing to some degree of the fresh fuel and oil and air mixture with the burned gas in cylinder 4 above piston 3. This mixing is undesirable, as it renders the explosions less potent, causes misfiring, etc. But the mixing is very greatly reduced in this engine, because the burned gas escapes from one end of cylinder 4 above piston 3 and the fresh fuel and oil and air mixture enters at the other end and forces the burned gas before it toward and out of exhaust ports 18. And when the engine is throttled one end of cylinder 4 above piston 3 contains fresh fuel and oil and air mixture and the other end contains burned gas, when piston 3 ascends in cylinder 4 and covers exhaust ports 18. Also, combustion chamber passages 17 contain at this time fresh fuel and oil and air mixture practically unmixed with any burned gas. When piston 3 ascends in cylinder 4 after covering exhaust ports 18 it forces the fresh fuel and oil and air mixture in cylinder 4 above piston 3 up toward and into combustion chamber passages 17 and so against spark plugs or plug 25. The purpose of the metal wall 26 is to separate the part of the combustion chamber of the engine containing intake valves 11 and leading to cylinder 4 above piston 3 into the two long tubelike passages 17 and so to reduce turbulence and consequent mixing of the fresh fuel and oil and air mixture with the burned gas in those passages. The combustion chamber is so designed that its greater part is in combustion chamber passages 17 so that when the piston 3 reaches the limit of its ascent, in cylinder 4, most of the gases in cylinder 4 are forced into combustion chamber passages 17 and excessive turbulence and mixing of the fresh fuel and oil and air mixture with the burned gases is prevented.

The part of the combustion chamber immediately above the bore of the cylinder 4 and below the circular part into which combustion chamber passages 17 converge is cone shaped so as to distribute the fresh fuel and oil and air mixture entering cylinder 4 above piston 3 approximately evenly to all parts of cylinder 4 above piston 3, and the upper end of piston 3 is dome or cone shaped so as to occupy space and force most of the gases in cylinder 4 above piston 3 into combustion chamber channels 17 when piston 3 reaches the limit of its ascent in cylinder 4.

When the engine is not throttled there is practically no value to the metal wall 26, but when throttled to a great degree the valve of the metal wall 26 is appreciable. The use of duplicate simultaneously operated intake valves 11 instead of one large intake valve is of value because, beside providing sufficient area of valve opening with small and consequently light valves that operate satisfactorily at high speeds, their use allows combustion chamber passages 17 to be separate throughout their whole length except for the presence of the minor hole 27. This hole could be omitted in the design of combustion chamber shown in Fig. 2 if desired. The result of combustion chamber passages 17 being practically or entirely separate throughout their length is to greatly reduce the hitherto described mixing of the fresh fuel and oil and air mixture with the burned gas in the combustion chamber passages 17.

Spark plug 29 is placed in the part of the combustion chamber above cylinder 4 close to the ends of combustion chamber passages 17 where those passages converge. Spark plug 29 desirably fires simultaneously with spark plug or plugs 25. The purpose of spark plug 29 is to provide additional means of ignition so as to effect quick ignition when the engine is operating at full throttle. This is particularly advantageous at high speed. It is desirable to place spark plug 29 close to the ends of combustion chamber passages 17 where those passages converge so that ignition is caused at both ends of those passages at such time. When the engine is considerably throttled, spark plug 29 is of little or no value and its use can be discontinued if desired.

The result of the features of invention in this engine is that throttling to very great extent can be effected without causing the explosions to become less potent on account of the mixing of the fresh fuel and oil and air mixture with the burned gas and without causing misfiring from the same cause. Misfiring in this engine is very unlikely, even when the engine is throttled to extreme extent, the small amount of fresh fuel and oil and air mixture that enters combustion chamber passages 17 past intake valves 11 remaining in those passages during the time when piston 3 uncovers exhaust ports 18 and is compressed back against spark plugs or plug 25 practically unmixed with burned gas when piston 3 ascends in cylinder 4 after covering exhaust ports 18.

The reduction of mixing of the fresh fuel and air and oil mixture with the burned gas and also the fact that the maximum pressure to which the gases in the cylinder 4 above piston 3 are compressed when piston 3 ascends in the cylinder 4 after covering exhaust ports 18 is always nearly the same, regardless of the degree of throttling and the varying engine speed result is satisfactory thermal efficiency from the engine at all times, even though the wall area of the combustion chamber is considerable. And the engine has the advantages of two stroke cycle engines in general of great power output for the cylinder capacity and of practically constant torque with a small number of cylinders.

The purpose of the wire gauze cone 23 is to prevent ignition of the compressed fuel and oil and air mixture in the tube 22 and crank case 13 when intake valves 11 are opened.

The purpose of passing the fuel and oil and air mixture around the cam shaft 7 and cams 10 when the compressed fuel and oil and air mixture passes from the crank case 13 to the tube 22 when the intake valves 11 are opened by the cams 10 is to effect lubrication of cam shaft 7, duplicate cams 10, and duplicate cam followers 28.

Figure 4 shows the cam shaft 7 and duplicate cams 10 and duplicate cam followers 28. Cams 10 are duplicate, not only in contour but also in their positions on the cam shaft 7 so that intake valves 11 act simultaneously.

Fig. 5 shows the valve and port opening and closing digrammatically as I have designed this engine, although other times of valve and port opening and closing may be used. In Fig. 5 the piston begins to uncover the exhaust ports when the crank is sixty degrees before the lower center and completely covers the exhaust ports when the crank is sixty degrees beyond the lower center. The intake valves begin to open when the crank is forty-five degrees before the lower center and close completely at the same time as that at which the piston completely covers the exhaust ports when the crank is sixty degrees beyond the lower center.

The term "combustion chamber," as used in the specification and included in the claims, means the space within the cylinder and cylinder head member, including the passages or passage through which fuel and air mixture flows from the intake valves or intake valve to the cylinder, into which space the piston has compressed the previous content of the cylinder when the piston is at the limit of its movement from the crankshaft.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A two stroke cycle internal combustion engine including a cylinder; a piston within said cylinder; a crank-shaft driven by said piston, there being an exhaust port in said cylinder uncovered by said piston in moving toward said crankshaft; an enclosed crank case; means for admitting gaseous fuel into said crank case and for allowing compression of gaseous fuel therein; a tubular connection between said crank case and the combustion chamber of said cylinder; a plurality of intake valves through the ports of which gaseous fuel from said tubular connection enters the said combustion chamber; a plurality of passages constituting part of the said combustion chamber, near one end of each of which passages one of said intake valves opens into the said combustion chamber, the other end of each of which passages being at the region of the said combustion chamber near said cylinder; and means at the end regions of said passages near which regions said intake valves open into the said combustion chamber for ignition of gaseous fuel therein.

2. A two stroke cycle internal combustion engine including a cylinder; a piston within said cylinder; a crankshaft driven by said piston, there being an exhaust port in said cylinder uncovered by said piston in moving toward said crankshaft; an enclosed crankcase; means for admitting gaseous fuel into said crankcase and for allowing compression of gaseous fuel therein; a tubular connection between said crankcase and the combustion chamber of said cylinder; a plurality of intake valves through the ports of which gaseous fuel from said tubular connection enters the said combustion chamber; a plurality of passages constituting part of the said combustion chamber, near one end of each of which passages one of said intake valves opens into the said combustion chamber, the other end of each of which passages being at the region of the said combustion chamber near said cylinder; means at the end region of said passages near which region said intake valves open into the said combustion chamber for ignition of gaseous fuel therein; and means at the end region of said passages near which region said intake valves open into the said combustion chamber for allowing ignition of gaseous fuel in one of said passages from the burning gaseous fuel in another of said passages.

3. A two stroke cycle internal combustion engine including a cylinder; a piston within said cylinder; a crankshaft driven by said piston, there being an exhaust port in said cylinder uncovered by said piston in moving toward said crank shaft; an enclosed crankcase; means for admitting gaseous fuel into said crankcase and for allowing compression of gaseous fuel therein; a tubular connection between said crankcase and the combustion chamber of said cylinder; a plurality of intake valves through the ports of which gaseous fuel from said tubular connection enters the said combustion chamber; a plurality of passages constituting part of the said combustion chamber, near one end of each of which passages one of said intake valves opens into the said combustion chamber, the other end of each of which passages being at the region of the said combustion chamber near said cylinder; means at the end regions of said passages near which regions said intake valves open into the said combustion chamber for ignition of gaseous fuel therein; and means at the region of the said combustion chamber near said cylinder for ignition of gaseous fuel therein.

4. A two stroke cycle internal combustion engine including a cylinder; a piston within said cylinder; a crankshaft driven by said piston, there being an exhaust port in said cylinder uncovered by said piston in moving toward said crank shaft; an enclosed crank case; means for admitting gaseous fuel into said crank case and for allowing compression of gaseous fuel therein; a tubular connection between said crankcase and the combustion chamber of said cylinder; a plurality of intake valves through the ports of which gaseous fuel from said tubular connection enters the said combustion chamber; a plurality of passages constituting part of the said combustion chamber, near one end of each of which passages one of said intake valves opens into the said combustion chamber, the other end of each of which passages being at the region of the said combustion chamber near said cylinder; means at the end regions of said passages near which regions said intake valves open into the said combustion chamber for ignition of gaseous fuel therein; means at the end regions of said passages near which regions said intake valves open into the said combustion chamber for allowing ignition of gaseous fuel in one of said passages from the burning gaseous fuel in another of said passages; and means at the region of the said combustion chamber near said cylinder for ignition of gaseous fuel therein.

5. A two stroke cycle internal combustion engine including a cylinder; a piston within said cylinder; a crank-shaft driven by said piston, there being an exhaust port in said cylinder uncovered by said piston in moving toward said crankshaft; means for compressing gaseous fuel previously to its admission to the combustion chamber of said cylinder; a plurality of intake valves through the ports of which gaseous fuel from said means for compressing gaseous fuel enters the said combustion chamber; a plurality of passages constituting part of the said combustion chamber, near one end of each of which passages one of said intake valves opens into the said combustion chamber, the other end of each of which passages being at the region of the said combustion chamber near said cylinder; and means at the end regions of said passages near which regions said intake valves open into the said combustion chamber for ignition of gaseous fuel therein.

6. A two stroke cycle internal combustion engine including a cylinder; a piston within said cylinder; a crankshaft driven by said piston, there being an exhaust port in said cylinder uncovered by said piston in moving toward said crankshaft; means for compressing gaseous fuel previously to its admission to the combustion chamber of said cylinder; a plurality of intake valves through the ports of which gaseous fuel from said means for compressing gaseous fuel enters the said combustion chamber; a plurality of passages constituting part of the said combustion chamber, near one end of each of which passages one of said intake valves opens into the said combustion chamber, the other end of each of which passages being at the region of the said combustion chamber near said cylinder; means at the end regions of said passages near which regions said intake valves open into the said combustion chamber for ignition of gaseous fuel therein; and means at the end regions of said passages near which regions said intake valves open into the said combustion chamber for allowing ignition of gaseous fuel in one of said passages from the burning gaseous fuel in another of said passages.

7. A two stroke cycle internal combustion engine including a cylinder; a piston within said cylinder; a crank shaft driven by said piston, there being an exhaust port in said cylinder uncovered by said piston in moving toward said crankshaft; means for compressing gaseous fuel previously to its admission to the combustion chamber of said cylinder; a plurality of intake valves through the ports of which gaseous fuel from said means for compressing gaseous fuel enters the said combustion chamber; a plurality of passages constituting part of the said combustion chamber, near one end of each of which passages one of said intake valves opens into the said combustion chamber, the other end of each of which passages being at the region of the said combustion chamber near said cylinder; means at the end regions of said passages near which regions said intake valves open into the said combustion chamber for ignition of gaseous fuel therein; and means at the region of the said combustion chamber near said cylinder for ignition of gaseous fuel therein.

8. A two stroke cycle internal combustion engine including a cylinder; a piston within said cylinder; a crankshaft driven by said piston, there being an exhaust port in said cylinder uncovered by said piston in moving toward said crankshaft; means for compressing gaseous fuel previously to its admission to the combustion chamber of said cylinder; a plurality of intake valves through the ports of which gaseous fuel from said means for compression gaseous fuel enters the said combustion chamber, a plurality of passages constituting part of the said combustion chamber, near one end of each of which passages one of said intake valves opens into the said combustion chamber, the other end of each of which passages being at the region of the said combustion chamber near said cylinder; means at the end regions of said passages near which regions said intake valves open into the said combustion chamber for ignition of gaseous fuel therein; means at the end regions of said passages near which regions said intake valves open into the said combustion chamber for allowing ignition of gaseous fuel in one of said passages from the burning gaseous fuel in another of said passages; and means at the region of the said combustion chamber near said cylinder for ignition of gaseous fuel therein.

9. A two stroke cycle internal combustion engine including a cylinder; a piston within said cylinder; a crankshaft driven by said piston; means for exhausting burned gaseous fuel from said cylinder; means for compressing gaseous fuel previously to its admission to the combustion chamber of said cylinder; a plurality of intake valves through the ports of which gaseous fuel from said means for compressing gaseous fuel enters the said combustion chamber; a plurality of passages constituting part of the said combustion chamber, near one end of each of which passages one of said intake valves opens into the said combustion chamber, the other end of each of which passages being at the region of the said combustion chamber near said cylinder; and means at the end regions of said passages near which regions said intake valves open into the said combustion chamber for ignition of gaseous fuel therein.

10. A two stroke cycle internal combustion engine including a cylinder; a piston within said cylinder; a crank shaft driven by said piston; means for exhausting burned gaseous fuel from said cylinder; means for compressing gaseous fuel previously to its admission to the combustion chamber of said cylinder; a plurality of intake valves through the ports of which gaseous fuel from said means for compressing gaseous fuel enters the said combustion chamber; a plurality of passages constituting part of the said combustion chamber, near one end of each of which passages one of said intake valves opens into the said combustion chamber, the other end of each of which passages being at the region of the said combustion chamber near said cylinder; means at the end regions of said passages near which regions said intake valves open into the said combustion chamber for ignition of gaseous fuel therein; and means at the end regions of said passages near which regions said intake valves open into the said combustion chamber for allowing ignition of gaseous fuel in one of said passages from the burning gaseous fuel in another of said passages.

11. A two stroke cycle internal combustion engine including a cylinder; a piston within said cylinder; a crankshaft driven by said piston; means for exhausting burned gaseous fuel from said cylinder; means for compressing gaseous fuel previously to its admission to the combustion chamber of said cylinder; a plurality of intake valves through the ports of which gaseous fuel from said means for compressing gaseous fuel enters the said combustion chamber; a plurality of passages constituting part of the said combustion chamber, near one end of each of which passages one of said intake valves opens into the said combustion chamber, the other end of each of which passages being at the region of the said combustion chamber near said cylinder; means at the end regions of said passages near which regions said intake valves open into the said combustion chamber for ignition of gaseous fuel therein; and means at the region of the said combustion chamber near said cylinder for ignition of gaseous fuel therein.

12. A two stroke cycle internal combustion engine including a cylinder; a piston within said cylinder; a crankshaft driven by said piston; means for exhausting burned gaseous fuel from said cylinder; means for compressing gaseous fuel previously to its admission to the combustion chamber of said cylinder; a plurality of intake valves through the ports of which gaseous fuel from said means for compressing gaseous fuel enters the said combustion chamber; a plurality of passages constituting part of the said combustion chamber, near one end of each of which passages, one of said intake valves opens into the said combustion chamber, the other end of each of which passages being at the region of the said combustion chamber near said cylinder; means at the end regions of said passages near which regions said intake valves open into the said combustion chamber for ignition of gaseous fuel therein; means at the end regions of said passages near which regions said intake valves open into the said combustion chamber for allowing ignition of gaseous fuel in one of said passages from the burning gaseous fuel in another of said passages; and means at the region of the said combustion chamber near said cylinder for ignition of gaseous fuel therein.

13. A two stroke cycle internal combustion engine including a cylinder; a piston within said cylinder; a crankshaft driven by said piston; means for exhausting burned gaseous fuel from said cylinder; an enclosed crankcase; means for admitting gaseous fuel into said crankcase and for allowing compression of gaseous fuel therein; a tubular connection between said crankcase and the combustion chamber of said cylinder; an intake valve through the port of which gaseous fuel from said tubular connection enters the said combustion chamber; a plurality of passages constituting part of the said combustion chamber, near one end of which passages said intake valve opens into the said combustion chamber, the other end of which passages being at the region of the said combustion chamber near said cylinder; and means at the end region of said passages near which region said intake valve opens into the said combustion chamber for ignition of gaseous fuel therein.

14. A two stroke cycle internal combustion engine including a cylinder; a piston within said cylinder; a crankshaft driven by said piston; means for exhausting burned gaseous fuel from said cylinder; means for compressing gaseous fuel previously to its admission to the combustion chamber of said cylinder; an intake valve through the port of which gaseous fuel from said means for compressing gaseous fuel enters the said combustion chamber; a plurality of passages constituting part of the said combustion chamber, near one end of which passages said intake valve opens into the said combustion chamber, the other end of which passages being at the region of the said combustion chamber near said cylinder; and means at the end region of said passages near which region said intake valve opens into the said combustion chamber for ignition of gaseous fuel therein.

15. A two stroke cycle internal combustion engine including a cylinder; a piston within said cylinder; a crankshaft driven by said piston; means for exhausting burned gaseous fuel from said cylinder; an enclosed crankcase; means for admitting gaseous fuel into said crankcase and for allowing compression of gaseous fuel therein; a tubular connection between said crankcase and the combustion chamber of said cylinder; an intake valve through the port of which gaseous fuel from said tubular connection enters the said combustion chamber; a plurality of passages constituting part of the said combustion chamber, near one end of which passages said intake valve opens into the said combustion chamber, the other end of which passages being at the region of the said combustion chamber near said cylinder; means at the end region of said passages near which region said intake valve opens into the said combustion chamber for ignition of gaseous fuel therein; and means at the region of the said combustion chamber near said cylinder for ignition of gaseous fuel therein.

16. A two stroke cycle internal combustion engine including a cylinder; a piston within said cylinder; a crankshaft driven by said piston; means for exhausting burned gaseous fuel from said cylinder; means for compressing gaseous fuel previously to its admission to the combustion chamber of said cylinder; an intake valve through the port of which gaseous fuel from said means for compressing gaseous fuel enters the said combustion chamber; a plurality of passages constituting part of the said combustion chamber, near one end of which passages said intake valve opens into the said combustion chamber, the other end of which passages being at the region of the said combustion chamber near said cylinder; means at the end region of said passages near which region said intake valve opens into the said combustion chamber for ignition of gaseous fuel therein; and means at the region of the said combustion chamber near said cylinder for ignition of gaseous fuel therein.

17. An internal combustion engine including a cylinder; a piston within said cylinder; a crankshaft driven by said piston; means for exhausting burned gaseous fuel from said cylinder; an intake valve through the port of which gaseous fuel enters the combustion chamber of said cylinder; a plurality of passages constituting part of the said combustion chamber, near one end of which passages said intake valve opens into the said combustion chamber, the other end of which passages being at the region of the said combustion chamber near said cylinder; and means at the end region of said passages near which region said intake valve opens into the said combustion chamber for ignition of gaseous fuel therein.

18. An internal combustion engine including a cylinder; a piston within said cylinder; a crankshaft driven by said piston; means for exhausting burned gaseous fuel from said cylinder; an intake valve through the port of which gaseous fuel enters the combustion chamber of said cylinder; a plurality of passages constituting part of the said combustion chamber, near one end of which passages said intake valve opens into the said combustion chamber, the other end of which passages being at the region of the said combustion chamber near said cylinder; means at the end region of said passages near which region said intake valve opens into the said combustion chamber for ignition of gaseous fuel therein; and means at the region of the said combustion chamber near said cylinder for ignition of gaseous fuel therein.

19. An internal combustion engine including a cylinder; a piston within said cylinder; a crankshaft driven by said piston; means for exhausting burned gaseous fuel from said cylinder; a plurality of intake valves through the ports of which gaseous fuel enters the combustion chamber of said cylinder; a plurality of passages constituting part of the said combustion chamber, near one end of each of which passages one of said intake valves opens into the said combustion chamber, the other end of each of which passages being at the region of the said combustion chamber near said cylinder; means at the end regions of said passages near which regions said intake valves open into the said combustion chamber for ignition of gaseous fuel therein; and means at the end regions of said passages near which regions said intake valves open into the said combustion chamber for allowing ignition of gaseous fuel in one of said passages from the burning gaseous fuel in another of said passages.

20. An internal combustion engine including a cylinder; a piston within said cylinder; a crankshaft driven by said piston; means for exhausting burned gaseous fuel from said cylinder; a plurality of intake valves through the ports of which gaseous fuel enters the combustion chamber of said cylinder; a plurality of passages constituting part of the said combustion chamber, near one end of each of which passages one of said intake valves opens into the said combustion chamber, the other end of each of which passages being at the region of the said combustion chamber near said cylinder; means at the end regions of said passages near which regions said intake valves open into the said combustion chamber for ignition of gaseous fuel therein; means at the end regions of said passages near which regions said intake valves open into the said combustion chamber for allowing ignition of gaseous fuel in one of said passages from the burning gaseous fuel in another of said passages; and means at the region of the said combustion chamber near said cylinder for ignition of gaseous fuel therein.

21. A two stroke cycle internal combustion engine including a cylinder; a piston within said cylinder; a crankshaft driven by said piston, there being an exhaust port in said cylinder uncovered by said piston in moving toward said crankshaft; means for compressing gaseous fuel previously to its admission to the combustion chamber of said cylinder; a plurality of intake valves through the ports of which gaseous fuel from said means for compressing gaseous fuel enters the said combustion chamber; a plurality of passages constituting part of the said combustion chamber, near one end of each of which passages one of said intake valves opens into the said combustion chamber, the other end of each of which passages being at the region of the said combustion chamber near said cylinder; and a plurality of means for ignition of gaseous fuel, one at the end region of each of said passages at which region one of said intake valves opens into the said combustion chamber.

22. A two stroke cycle internal combustion engine including a cylinder; a piston within said cylinder; a crankshaft driven by said piston, there being an exhaust port in said cylinder uncovered by said piston in moving toward said crankshaft; means for compressing gaseous fuel previously to its admission to the combustion chamber of said cylinder; a plurality of intake valves through the ports of which gaseous fuel from said means for compressing gaseous fuel enters the said combustion chamber; a plurality of passages constituting part of the said combustion chamber, near one end of each of which passages one of said intake valves opens into the said combustion chamber, the other end of each of which passages being at the region of the said combustion chamber near said cylinder; a plurality of means for ignition of gaseous fuel, one at the end region of each of said passages at which region one of said intake valves opens into the said combustion chamber; and means at the end regions of said passages at which regions said intake valves open into the said combustion chamber for allowing ignition of gaseous fuel in one of said passages from the burning gaseous fuel in another of said passages.

23. A two stroke cycle internal combustion engine including a cylinder; a piston within said cylinder; a crankshaft driven by said piston; means for exhausting burned gaseous fuel from said cylinder; means for compressing gaseous fuel previously to its admission to the combustion chamber of said cylinder; an intake valve operated in an opening direction by said crankshaft by means of mechanical members and through the port of which gaseous fuel from said means for compressing gaseous fuel enters the said combustion chamber; a passage constituting the greater part of the said combustion chamber, near one end of which passage said intake valve opens into the said combustion chamber, the other end of which passage being at the region of the said combustion chamber near said cylinder; and means at the end region of said passage at which region said intake valve opens into the said combustion chamber for ignition of gaseous fuel therein.

24. A two stroke cycle internal combustion engine including a cylinder; a piston within said cylinder; a crankshaft driven by said piston; means for exhausting burned gaseous fuel from said cylinder; means for compressing gaseous fuel previously to its admission to the combustion chamber of said cylinder; an intake valve operated in an opening direction by said crankshaft by means of mechanical members and through the port of which gaseous fuel from said means for compressing gaseous fuel enters the said combustion chamber; a passage constituting the greater part of the said combustion chamber, near one end of which passage said intake valve opens into the said combustion chamber, the other end of which passage being at the region of the said combustion chamber near said cylinder; means at the end region of said passage at which region said intake valve opens into the said combustion chamber for ignition of gaseous fuel therein; and means at the region of the said combustion chamber near said cylinder for ignition of gaseous fuel therein.

25. A two stroke cycle internal combustion engine including a cylinder; a piston within said cylinder; a crankshaft driven by said piston, there being an exhaust port in said cylinder uncovered by said piston in moving toward said crankshaft; an enclosed crankcase; means for admitting gaseous fuel into said crankcase and for allowing compression of gaseous fuel therein; a tubular connection between said crankcase and the combustion chamber of said cylinder; an intake valve operated in an opening direction by said crankshaft by means of mechanical members and through the port of which gaseous fuel from said tubular connection enters the said combustion chamber; a passage constituting the greater part of the said combustion chamber, near one end of which passage said intake valve opens into the said combustion chamber, the other end of which passage being at the region of the said combustion chamber near said cylinder; and means at the end region of said passage at which region said intake valve opens into the said combustion chamber for ignition of gaseous fuel therein.

26. A two stroke cycle internal combustion engine including a cylinder; a piston within said cylinder; a crank shaft driven by said piston, there being an exhaust port in said cylinder uncovered by said piston in moving toward said crankshaft; an enclosed crankcase; means for admitting gaseous fuel into said crankcase and for allowing compression of gaseous fuel therein; a tubular connection between said crank case and the combustion chamber of said cylinder; an intake valve operated in an opening direction by said crankshaft by means of mechanical members and through the port of which gaseous fuel from said tubular connection enters the said combustion chamber; a passage constituting the greater part of the said combustion chamber, near one end of which passage said intake valve opens into the said combustion chamber, the other end of which passage being at the region of the said combustion chamber near said cylinder; means at the end region of said passage at which region said intake valve opens into the said combustion chamber for ignition of gaseous fuel therein; and means at the region of the said combustion chamber near said cylinder for ignition of gaseous fuel therein.

27. A two stroke cycle internal combustion engine including a crankshaft; a cylinder; a piston within said cylinder and in operative connection with said crankshaft, an end portion of said piston projecting beyond a plane adjoining the cylindrical portion of said piston at the end of the said cylindrical portion farthest from said crankshaft; means for exhausting burned gaseous fuel from said cylinder; means for compressing gaseous fuel previously to its admission to the combustion chamber of said cylinder; an intake valve operated in an opening direction by said crankshaft by means of mechanical members and through the port of which gaseous fuel from said means for compressing gaseous fuel enters the said combustion chamber; a passage constituting the greater part of the said combustion chamber, near one end of which passage said intake valve opens into the said combustion chamber, the other end of which passage being at the region of the said combustion chamber near said cylinder; and means at the end region of said passage at which region said intake valve opens into the said combustion chamber for ignition of gaseous fuel therein.

28. A two stroke cycle internal combustion engine including a crankshaft; a cylinder; a piston within said cylinder and in operative connection with said crank shaft, an end portion of said piston projecting beyond a plane adjoining the cylindrical portion of said piston at the end of the said cylindrical portion farthest from said crankshaft; means for exhausting burned gaseous fuel from said cylinder; means for compressing gaseous fuel previously to its admission to the combustion chamber of said cylinder; an intake valve operated in an opening direction by said crankshaft by means of mechanical members and through the port of which gaseous fuel from said means for compressing gaseous fuel enters the said combustion chamber; a passage constituting the greater part of the said combustion chamber, near one end of which passage said intake valve opens into the said combustion chamber, the other end of which passage being at the region of the said combustion chamber near said cylinder; means at the end region of said passage at which region said intake valve opens into the said combustion chamber for ignition of gaseous fuel therein; and means at the region of the said combustion chamber near said cylinder for ignition of gaseous fuel therein.

29. A two stroke cycle internal combustion engine including a crankshaft; a cylinder; a piston within said cylinder and in operative connection with said crankshaft, an end portion of said piston projecting beyond a plane adjoining the cylindrical portion of said piston at the end of the said cylindrical portion farthest from said crankshaft, there being an exhaust port in said cylinder uncovered by said piston in moving toward said crankshaft; an enclosed crankcase; means for admitting gaseous fuel into said crankcase and for allowing compression of gaseous fuel therein; a tubular connection between said crankcase and the combustion chamber of said cylinder; an intake valve operated in an opening direction by said crankshaft by means of mechanical members and through the port of which gaseous fuel from said tubular connection enters the said combustion chamber; a passage constituting the greater part of the said combustion chamber, near one end of which passage said intake valve opens into the said combustion chamber, the other end of which passage being at the region of the said combustion chamber near said cylinder; and means at the end region of said passage at which region said intake valve opens into the said combustion chamber for ignition of gaseous fuel therein.

30. A two stroke cycle internal combustion engine including a crankshaft; a cylinder; a piston within said cylinder and in operative connection with said crank shaft, an end portion of said piston projecting beyond a plane adjoining the cylindrical portion of said piston at the end of the said cylindrical portion farthest from said crankshaft, there being an exhaust port in said cylinder uncovered by said piston in moving toward said crank shaft; an enclosed crankcase; means for admitting gaseous fuel into said crankcase and for allowing compression of gaseous fuel therein; a tubular connection between said crankcase and the combustion chamber of said cylinder; an intake valve operated in an opening direction by said crankshaft by means of mechanical members and through the port of which gaseous fuel from said tubular connection enters the said combustion chamber; a passage constituting the greater part of the said combustion chamber, near one end of which passage said intake valve opens into the said combustion chamber, the other end of which passage being at the region of the said combustion chamber near said cylinder; means at the end region of said passage at which region said intake valve opens into the said combustion chamber for ignition of gaseous fuel therein; and means at the region of the combustion chamber near said cylinder for ignition of gaseous fuel therein.

31. An internal combustion engine including a cylinder; a piston within said cylinder; a crankshaft driven by said piston; means for exhausting burned gaseous fuel from said cylinder; a plurality of intake valves through the ports of which gaseous fuel enters the combustion chamber of said cylinder; a plurality of passages constituting part of the said combustion chamber, near one end of each of which passages one of said intake valves opens into the said combustion chamber, the other end of each of which passages being at the region of the said combustion chamber near said cylinder; and means at the end regions of said passages at which regions said intake valves open into the said combustion chamber for ignition of gaseous fuel therein.

32. An internal combustion engine including a cylinder; a piston within said cylinder; a crankshaft driven by said piston; means for exhausting burned gaseous fuel from said cylinder; a plurality of intake valves through the ports of which gaseous fuel enters the combustion chamber of said cylinder; a plurality of passages constituting part of the said combustion chamber, near one end of each of which passages one of said intake valves opens into the said combustion chamber, the other end of each of which passages being at the region of the said combustion chamber near said cylinder; means at the end regions of said passages at which regions said intake valves open into the said combustion chamber for ignition of gaseous fuel therein; and means at the region of the said combustion chamber near said cylinder for ignition of gaseous fuel therein.

33. An internal combustion engine including a crankshaft; a cylinder; a piston within said cylinder and in operative connection with said crankshaft, an end portion of said piston projecting beyond a plane adjoining the cylindrical portion of said piston at the end of the said cylindrical portion farthest from said crankshaft; means for exhausting burned gaseous fuel from said cylinder; an intake valve operated in an opening direction by said crankshaft by means of mechanical members and through the port of which gaseous fuel enters the combustion chamber of said cylinder; a passage constituting the greater part of the said combustion chamber, near one end of which passage said intake valve opens into the said combustion chamber, the other end of which passage being at the region of the said combustion chamber near said cylinder; and means at the end region of said passage at which region said intake valve opens into the said combustion chamber for ignition of gaseous fuel therein.

34. An internal combustion engine including a crankshaft; a cylinder; a piston within said cylinder and in operative connection with said crankshaft, an end portion of said piston projecting beyond a plane adjoining the cylindrical portion of said piston at the end of the said cylindrical portion farthest from said crankshaft; means for exhausting burned gaseous fuel from said cylinder; an intake valve-operated in an opening direction by said crankshaft by means of mechanical members and through the port of which gaseous fuel enters the combustion chamber of said cylinder; a passage constituting the greater part of the said combustion chamber, near one end of which passage said intake valve opens into the said combustion chamber, the other end of which passage being at the region of the said combustion chamber near said cylinder; means at the end region of said passage at which region said intake valve opens into the said combustion chamber for ignition of gaseous fuel therein; and means at the region of the said combustion chamber near said cylinder for ignition of gaseous fuel therein.

35. A two stroke cycle internal combustion engine including a crankshaft; a cylinder; a piston within said cylinder and in operative connection with said crankshaft, an end portion of said piston projecting beyond a plane adjoining the cylindrical portion of said piston at the end of the said cylindrical portion farthest from said crankshaft; means for exhausting burned gaseous fuel from said cylinder; means for compressing gaseous fuel previously to its admission to the combustion chamber of said cylinder; an intake valve operated in an opening direction by said crankshaft by means of mechanical members and through the port of which gaseous fuel from said means for compressing gaseous fuel enters the said combustion chamber; a passage constituting part of the said combustion chamber, near one end of which passage said intake valve opens into the said combustion chamber, the other end of which passage being at the region of the said combustion chamber near said cylinder; and means at the end region of said passage at which region said intake valve opens into the said combustion chamber for ignition of gaseous fuel therein.

36. A two stroke cycle internal combustion engine including a crankshaft; a cylinder;

a piston within said cylinder and in operative connection with said crankshaft, an end portion of said piston projecting beyond a plane adjoining the cylindrical portion of said piston at the end of the said cylindrical portion farthest from said crankshaft; means for exahusting burned gaseous fuel from said cylinder; means for compressing gaseous fuel previously to its admission to the combustion chamber of said cylinder; an intake valve operated in an opening direction by said crankshaft by means of mechanical members and through the port of which gaseous fuel from said means for compressing gaseous fuel enters the said combustion chamber; a passage constituting part of the said combustion chamber, near one end of which passage said intake valve opens into the said combustion chamber, the other end of which passage being at the region of the said combustion chamber near said cylinder: means at the end region of said passage at which region said intake valve opens into the said combustion chamber for ignition of gaseous fuel therein; and means at the region of the said combustion chamber near said cylinder for ignition of gaseous fuel therein.

37. A two stroke cycle internal combustion engine including a crankshaft; a cylinder; a piston within said cylinder and in operative connection with said crankshaft, an end portion of said piston projecting beyond a plane adjoining the cylindrical portion of said piston at the end of the said cylindrical portion farthest from said crankshaft, there being an exhaust port in said cylinder uncovered by said piston in moving toward said crankshaft; an enclosed crankcase; means for admitting gaseous fuel into said crankcase and for allowing compression of gaseous fuel therein; a tubular connection between said crankcase and the combustion chamber of said cylinder; an intake valve operated in an opening direction by said crankshaft by means of mechanical members and through the port of which gaseous fuel from said tubular connection enters the said combustion chamber; a passage constituting part of the said combustion chamber, near one end of which passage said intake valve opens into the said combustion chamber, the other end of which passage being at the region of the said combustion chamber near said cylinder; and means at the end region of said passage at which region said intake valve opens into the said combustion chamber for ignition of gaseous fuel therein.

38. A two stroke cycle internal combustion engine including a crankshaft; a cylinder; a piston within said cylinder and in operative connection with said crankshaft, an end portion of said piston projecting beyond a plane adjoining the cylindrical portion of said piston at the end of the said cylindrical portion farthest from said crankshaft, there being an exhaust port in said cylinder uncovered by said piston in moving toward said crankshaft; an enclosed crankcase; means for admitting gaseous fuel into said crankcase and for allowing compression of gaseous fuel therein; a tubular connection between said crankcase and the combustion chamber of said cylinder; an intake valve operated in an opening direction by said crankshaft by means of mechanical members and through the port of which gaseous fuel from said tubular connection enters the said combustion chamber; a passage constituting part of the said combustion chamber, near one end of which passage said intake valve opens into the said combustion chamber, the other end of which passage being at the region of the said combustion chamber near said cylinder; means at the end region of said passage at which region said intake valve opens into the said combustion chamber for ignition of gaseous fuel therein; and means at the region of the said combustion chamber near said cylinder for ignition of gaseous fuel therein.

In witness whereof, I hereunto subscribe my name this 30th day of September A. D., 1919.

STANLEY B. ARNOLD.